US012784360B2

(12) United States Patent
Beltrand et al.

(10) Patent No.: US 12,784,360 B2
(45) Date of Patent: Nov. 3, 2026

(54) METHOD FOR MODIFYING A 3D MODEL BY USING A PARTIAL SKETCH

(71) Applicant: DASSAULT SYSTEMES, Velizy Villacoublay (FR)

(72) Inventors: Nicolas Beltrand, Velizy Villacoublay Cedex (FR); Fivos Doganis, Velizy Villacoublay Cedex (FR); Mourad Boufarguine, Velizy Villacoublay Cedex (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 112 days.

(21) Appl. No.: 18/825,252

(22) Filed: Sep. 5, 2024

(65) Prior Publication Data

US 2025/0078407 A1 Mar. 6, 2025

(30) Foreign Application Priority Data

Sep. 5, 2023 (EP) .................................... 23306471

(51) Int. Cl.

| | |
|---|---|
| ***G06T 17/10*** | (2006.01) |
| ***G06T 15/20*** | (2011.01) |
| ***G06T 17/20*** | (2006.01) |
| ***G06T 19/20*** | (2011.01) |

(52) U.S. Cl.

CPC ............. *G06T 17/10* (2013.01); *G06T 15/20* (2013.01); *G06T 17/20* (2013.01); *G06T 19/20* (2013.01); *G06T 2219/2012* (2013.01)

(58) Field of Classification Search

None

See application file for complete search history.

(56) References Cited

U.S. PATENT DOCUMENTS 10,430,524 B1 * 10/2019 Stiles .................. G06F 3/04815

OTHER PUBLICATIONS

Guillard, Benoit et al.: "Sketch2Mesh: Reconstructing and Editing 3D Shapes from Sketches", 2021 IEEE/CVF International Conference on Computer Vision (ICCV), IEEE, Oct. 10, 2021 (Oct. 10, 2021), pp. 13003-13012, XP034093713, DOI:10.1109/ICCV48922.2021.01278. (10 pages).

(Continued)

*Primary Examiner* — Nicholas R Wilson

(74) *Attorney, Agent, or Firm* — Oblon, McClelland, Maier & Neustadt, L.L.P.

(57) ABSTRACT

A computer-implemented method for designing a 3D model, which includes providing an initial 3D model in a 3D scene including at least one extruded section, being defined by a set of parameters, receiving a user sketch on the plane perpendicular to the sight of view direction, at each iteration: modifying at least one of said parameters, thereby obtaining a modified 3D model, performing a perspective projection, on a plane perpendicular to the sight of view direction, of the modified 3D mode, thereby obtaining a 2D visible wireframe including the visible inner and outer edges of the modified 3D model, computing an energy including a first term which penalizes an inconsistency between the modified and the initial 3D model, and a second term which penalizes a mismatch between the 2D visible wireframe and the user sketch, said parameters being modified to minimize said energy, and outputting the modified 3D model.

20 Claims, 15 Drawing Sheets

(56) References Cited

OTHER PUBLICATIONS

Li, Changjian et al, "Sketch2CAD: Sequential CAD modeling by Sketching in Context", ACM Transactions on Graphics, ACM, NY, US, vol. 39, No. 6, Nov. 26, 2020 (Nov. 26, 2020), pp. 1-14, XP058683346, ISSN: 0730-0301, DOI: 10.1145/3414685.3417807. (14 pages).
Kang, Yuna et al.: "Editing 3D models on smart devices", Computer-Aided Design, Elsevier Publishers Bv., Barking, GB, vol. 59, Aug. 31, 2013 (Aug. 31, 2013), pp. 229-238, XP029108599, ISSN: 0010-4485, DOI: 10.1016/J.CAD.2013.08.001. (10 pages).
Extended European Search Report dated Mar. 19, 2024, issued in counterpart EP Application No. 23306471.6, (7 pages).

* cited by examiner

METHOD FOR MODIFYING A 3D MODEL BY USING A PARTIAL SKETCH

CROSS-REFERENCE TO RELATED APPLICATIONS

This application claims priority under 35 U.S.C. § 119 or 365 to European Application No. 23306471.6, filed on Sep. 5, 2023. The entire contents of the above application are incorporated herein by reference.

FIELD

The disclosure relates to the field of computers programs and systems, and more specifically to the field of computer-implemented method for modifying a three-dimensional (3D) modeled object in a 3D scene by using a user sketch. In particular, the disclosure belongs to the sketching field. The present embodiments could be used in any three-dimensional-based CAD software.

BACKGROUND

2D Sketching and 3D modeling are two major steps of industrial design. Sketching is typically done first, as it allows designers to express their vision quickly and approximately. Design sketches are then converted into 3D models for downstream engineering and manufacturing, using CAD tools that offer high precision and editability.

Existing software propose the creation of 3D models from hand-drawn sketches. The user draws in 2D, which is natural for the user, instead of having to sculpt 3D shapes.

However, the design intention of the user is not entirely fulfilled, and it may be useful to edit the 3D model, so as to refine it.

In "Sketch2Mesh: Reconstructing and Editing 3D Shapes from Sketches" (Guillard et al., ICCV 2021), an encoder/decoder architecture, based on a deep learning model, is trained to regress surface meshes from synthetic sketches. The user draws an initial sketch to obtain its 3D reconstruction. Then, he can manipulate the object in 3D and draw one or more desired modifications, with a complete or a partial sketch. 3D surfaces are then optimized to match each constraint, by solving an optimization problem of minimizing a 2D Chamfer Distance, which is based on an energy minimization strategy.

For example, in FIG. 8 of the article, the user draws a car as an input sketch, from a three-quarter view. A 3D model of a car is reconstructed from that view, using the same camera parameters and thus rendered in same image plane. Then, the user changes the viewpoint so as to have the car in a side view, from where he can shorten the length of the trunk and move forward the rear wheels.

In Sketch2Mesh, the user can only edit the external silhouette of the mesh and not sharp visible inner edges. Indeed, in Sketch2Mesh, the minimization of the 2D Chamfer Distance comprises finding the 3D mesh points that project to the contour of the foreground image, then minimizing the Chamfer distance between the contour and the sketch. Thus, the user cannot modify internal details of the 3D model, such as the windows, or the external rear glass (cf. example in FIG. 8 of the article).

Besides, editing a mesh has too many degrees of freedom (usually thousands of vertices to optimize). In addition of being computationally expensive, it may results in non-plausible mesh or with many defaults in the edited area. Thus, plausibilty constraints are added to the optimization algorithm in order to avoid those issues, which adds more processing to the optimization algorithm.

Therefore, there is a need for providing a computer-implemented method for designing a 3D model, which enables an edition of the inner edges of a 3D model, and which does not edit directly the mesh.

SUMMARY

An object of the present disclosure is a computer-implemented method for designing a 3D model, which comprises the steps of:

a) Providing an initial 3D model in a 3D scene, the initial 3D model comprising at least one extruded section, said extruded section being defined by a set of parameters;

b) Receiving a user sketch on the plane perpendicular to the sight of view direction;

c) At each iteration of a plurality of iterations:

c1) Modifying at least one of said parameters, thereby obtaining a modified 3D model;

c2) Performing a perspective projection, on a plane perpendicular to the sight of view direction, of the modified 3D model, thereby obtaining a 2D visible wireframe, said 2D visible wireframe comprising the visible inner and outer edges of the modified 3D model;

c3) Computing an energy which comprises a first term which penalizes an inconsistency between the modified 3D model and the initial 3D model, and a second term which penalizes a mismatch between the 2D visible wireframe and the user sketch;

said parameters being modified so as to minimize said energy;

d) outputting the modified 3D model.

BRIEF DESCRIPTION OF THE DRAWINGS

Additional features and advantages of the present embodiments will become apparent from the subsequent description, taken in conjunction with the accompanying drawings.

DETAILED DESCRIPTION

Figure 1:
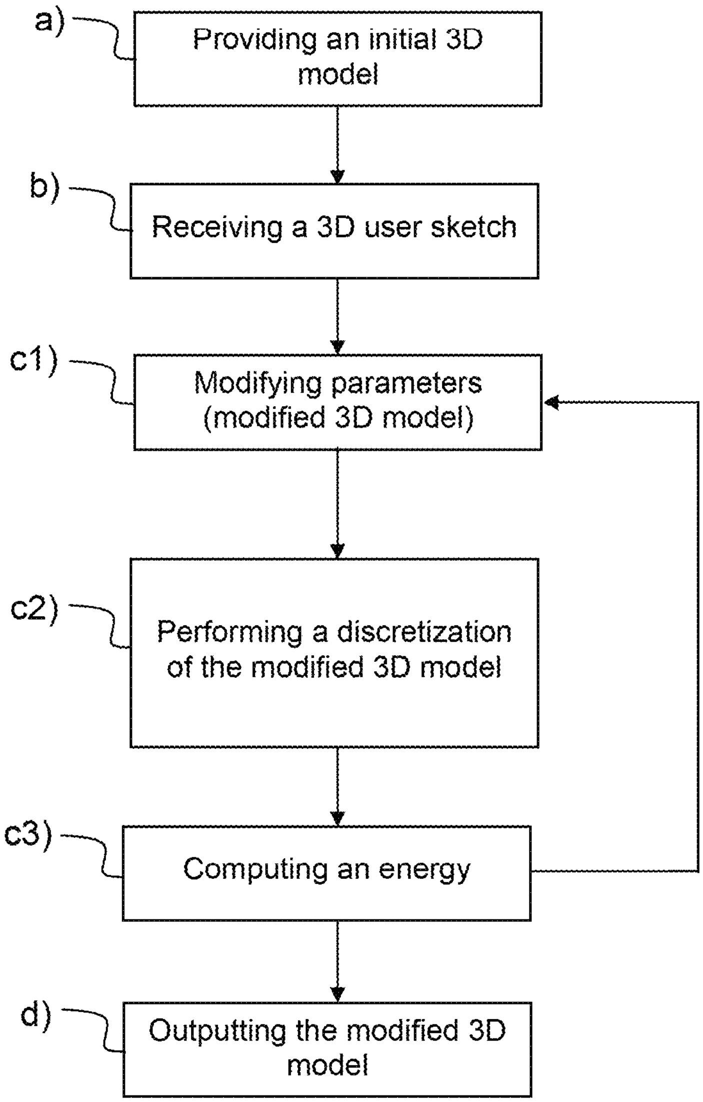
FIG. 1 illustrates a flowchart of the invented method.

Referring to the flowchart of FIG. 1, the invented method comprises a first step a) of providing an initial 3D model 1 comprising at least one linear extruded section 2, in a 3D scene. Examples of the initial 3D model 1 are provided in FIGS. 2 and 3.

Such an initial 3D model 1 may be inferred by using the Convolutional Neural Network (CNN) encoder which is disclosed in the patent application EP3958162A1. The disclosed encoder uses partial user sketches 18 and the learned patterns to encode the 2D sketch into data defining a 3D model.

The Convolutional Neural Network (CNN) encoder which is disclosed in the patent application EP3958162A1 infers a real time 3D primitive; thus the user receives a real-time feedback of the 3D primitive. Thus, the design process is not interrupted, and the user can continuously sketch while being guided by the proposed inference.

Figure 2:
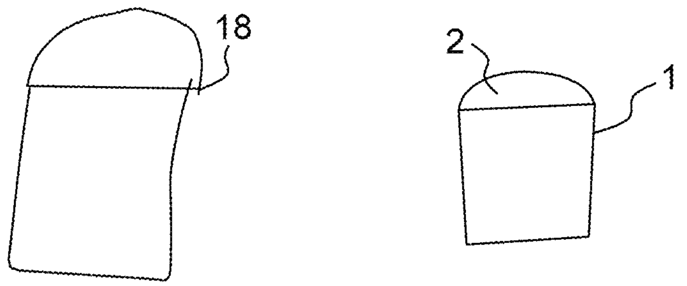
FIGS. 2 and 3 illustrate two examples of a 3D primitive inference from a user sketch.
Figure 3:
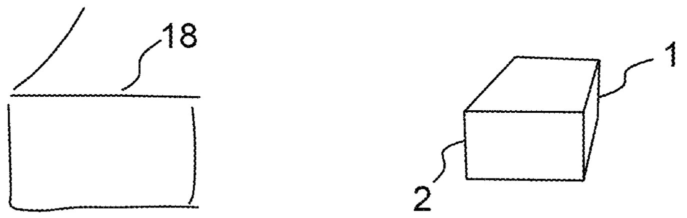

For example, in FIG. 2, the user sketches a rectangle, topped by a half-circle (left part of the figure). The encoder infers a half-cylinder as a 3D primitive. In FIG. 3, the user sketches a rectangle, and a stroke from an upper vertex of the rectangle. The encoder infers a parallelepiped as a 3D primitive.

To describe a 3D primitive, the following representation is used in patent application EP3958162A1:

- A list of 3D points $p_i$ of the planar section (typically the vertices of the planar section);
- A list of line type $l_i$ in {0, 1}describing whether two consecutive points of the section are connected with a segment or an arc;
- A 3D vector h representing the direction and length of extrusion.

It can be noted that it is not essential for the 3D model to be inferred by using the aforementioned encoder. The 3D model may simply be available in a CAD software, or it can be obtained from any other method such as a download from the Internet. The 3D model parameterization of such a 3D model may be easily and automatically converted to the aforementioned parameterization format (list of 3D points, list of line type, 3D vector) to represent a CAD model.

With the present method, the parameter corresponding to the line type does not change (the connection between two vertices will always be of the same type, the invented method only impacts the position of the vertices and the extrusion vector).

The method comprises a second step b) which consists in receiving a user sketch 3 on the plane perpendicular to the sight of view direction. Exemplary user sketches 3 are illustrated on the left parts of FIGS. 4-6.

The initial 3D model 1 is rendered onto the camera image plane, given camera settings (intrinsic and extrinsic parameters). The user sketch 3 is drawn (or projected) on this same camera image plane.

The user sketch 3 may be input in the CAD tool by means of a mouse, an appendage (finger or stylus), or any suitable haptic device.

By using a mouse, the user drags the pointer, i.e., a combination of displacement of the mouse and long press on one of the mouse buttons. In touch mode, by using a touchscreen, the user moves the appendage (stylus or finger) on the touchscreen, with a maintained contact between them.

Figure 4:
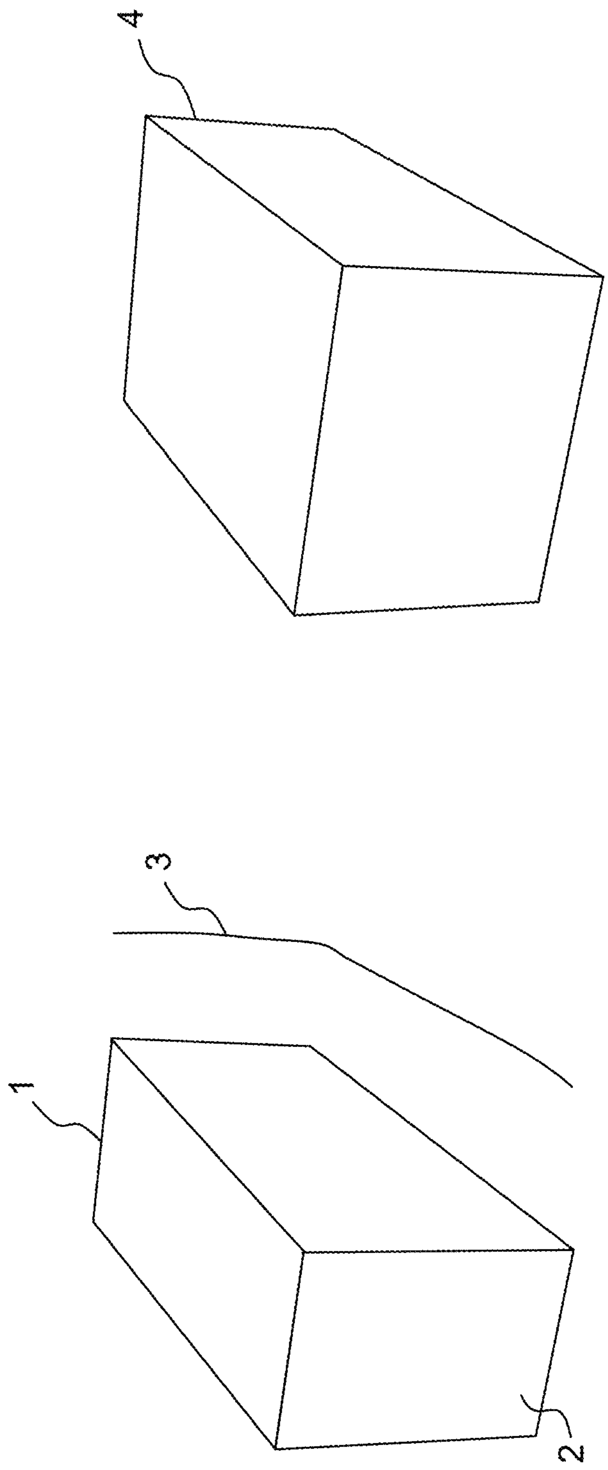
FIGS. 4, 5 and 6 illustrate several examples of edition of a 3D model by using the invented method.

In the example of FIG. 4, the user sketches a stroke 3 out of the projection of the initial 3D model 1 on the camera plane (plane perpendicular to the sight of view direction), along two adjacent vertices of the parallelepiped.

As a result, after several iterations (step c) of the method), the modified 3D model 4 is displayed (step d) of the method), as illustrated on the right part of FIG. 4. On FIG. 4, the modified parallelepiped is larger than the initial parallelepiped. The modified 3D model may be displayed continuously after each iteration, or at the end of all the iterations.

Figure 5:
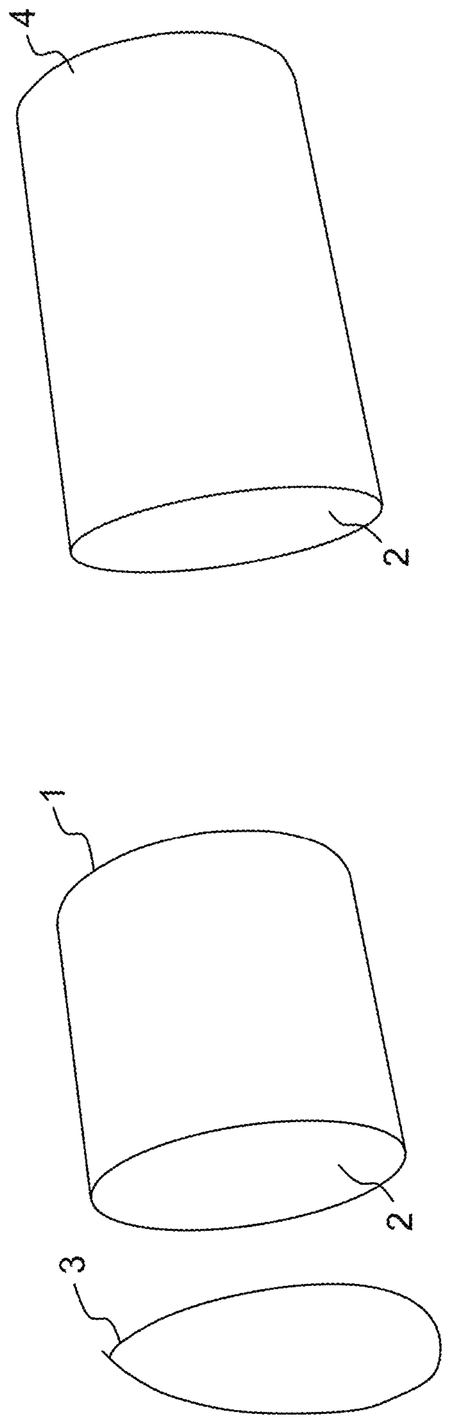

Another example is illustrated on FIG. 5. The initial 3D model 1 is a revolution cylinder, which is characterized by a basis and a height. The user sketch 3 is an elongated circle next to the basis of the cylinder. In reaction to the user sketch, after several iterations (step c) of the method), the modified 3D model 4 is displayed (step d) of the method), as illustrated on the right part of FIG. 5.

Figure 6:
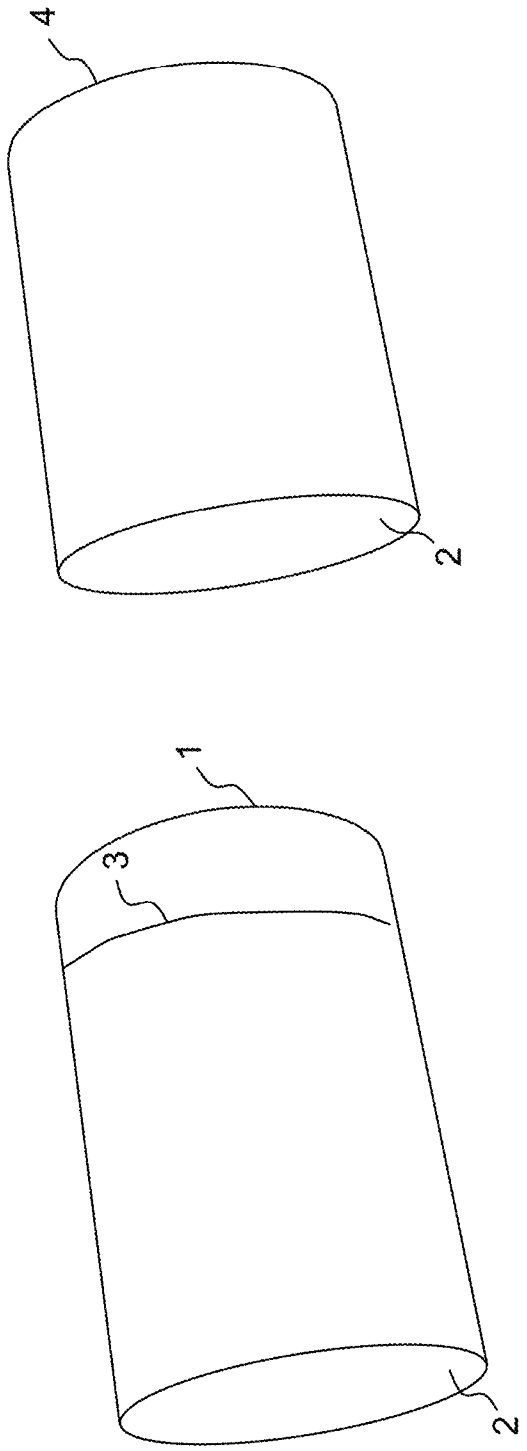

Another example is illustrated on FIG. 6. The initial 3D model 1 is a revolution cylinder. In reaction to a user sketch 3, the height of the cylinder is shortened, and fits on the user sketch.

It can be seen, on the examples of FIGS. 4-6, that the modified 3D model 4 matches with the user sketch 3, and the consistency between the modified 3D model 4 and the initial 3D model 1 is maintained.

An idea on which an embodiment relies is computing and optimizing parameters which define the 3D model. In one embodiment, the initial 3D model is defined by a linear extruded section, which can be expressed in the 3D scene by means of parameters, namely the position of 3D points $p_i$ of the section in the 3D scene and the extrusion vector h, expressed in the world coordinate space $R_W$.

Let $\hat{p}_i$ the points of the edited primitive (modified 3D model) and $\hat{h}$ the direction of extrusion of the edited primitive, expressed in the world coordinate space $R_W$.

Figure 7:
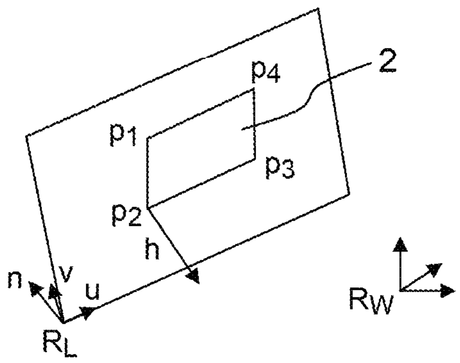
FIG. 7 illustrates the vertices and the extrusion vector of a 3D primitive.

FIG. 7 illustrates an exemplary section of a parallelepiped. The section is made of 3D points $p_1$, $p_2$, $p_3$, $p_4$, which are the vertices of the section.

In the present application, and for sake of clarity and conciseness, line types (i.e., segment or arc) are not optimized, because they are discrete parameters: they can either be a straight segment or an arc. During the optimization process, a straight segment remains a straight segment, an arc remains an arc. However, the optimization of the line types could be implemented by using a curve parameterization, or continuous parameters for the line type (parameter in [0, 1] with a linear transformation from segment to half circle arc).

A straightforward possibility would consist in directly optimizing the position of 3D points $p_i$ and the extrusion vector h, thus, having three degrees of freedom for each point and for the extrusion vector. However, it may lead to non-plausible results (the edited 3D points are not lying on a common plane), and it would make the optimization process harder to converge to the optimal solution due to a complex optimization space.

The disclosure advantageously defines all the points $\hat{p}_i$ of the edited primitive in a common orthonormal local reference frame $R_L$=(u, v, n), wherein u and v correspond to arbitrary vectors which define a plane of the section, and n is a normal to said plan (cf. FIG. 7).

The coplanarity of the points $\hat{p}_i$ of the edited primitive can be expressed as follows:

$$\hat{p}_i = p_i + o_{i,u}u + o_{i,v}v + o_n n$$

- $o_{i,u}$ corresponds to a first offset of the point $p_i$ along vector u.
- $o_{i,v}$ corresponds to a second offset of the point $p_i$ along vector v.

$o_n$ corresponds to a third offset of the point $p_i$ along vector n, said third offset on being identical for all the points $p_i$ of the section.

All the points of the edited primitive share the same offset on in the direction of the normal of the plane, in order to keep the points $\hat{p_i}$ in a plane. Therefore, the coplanarity between the points is maintained, and the invented method contributes to the achievement of plausible results.

The extrusion vector h of the edited primitive (modified 3D model) is expressed as follows:

$$\hat{h} = h + (o_h - o_n)n$$

$o_h$ corresponds to a fourth offset of the scale of the extrusion vector. It can be noted that the extrusion vector h of the edited primitive is not computed with the formula $\hat{h}=h+o_h n$, because when $o_n$ is different from zero then the section plane is translated. Thus, it is necessary to counter balance the extrusion length in order not to also translate the extruded section. When the offset $o_h=0$ then the extruded section is translated by $-o_n$, so in the 3D world space, the extruded section is at the same location. Therefore, with the above referenced definition of the extrusion vector h of the edited primitive, only the length of the extrusion vector is optimized, taking the third offset into account.

As a consequence, the modification of at least one of the parameters (sub-step c1, FIG. 1) comprises modifying at least one among said first offset, second offset, third offset or fourth offset. Thus, a modified 3D model 4, which comprises the modified parameter(s), is generated.

The number of parameters to optimize is equal to 1+nbSides*2+1, wherein nbSides corresponds to the number of vertices of the section of the initial 3D model. Each offset is initialized to zero for the first iteration step.

Figure 14:
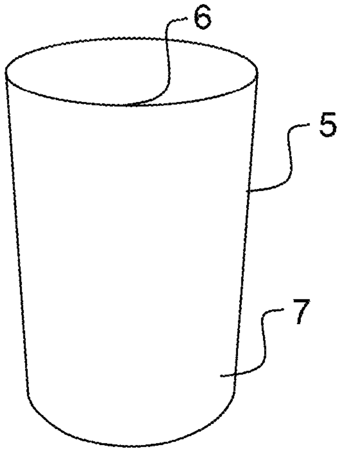

The second sub-step c2) comprises performing a perspective projection, on a plane perpendicular to the sight of view direction, of the modified 3D model 4, thereby obtaining a 2D visible wireframe 5, said 2D visible wireframe 5 comprising the visible inner 6 and outer edges 7 of the modified 3D model 4 (cf. FIG. 14).

Thanks to the generation of the 2D visible wireframe 5, the 3D model, which is only defined by parameters, can be displayed in the 3D scene. Otherwise, only the points of the section and the extrusion vector would be displayed.

Therefore, the user can edit the external silhouette of the mesh and the visible inner edges as well.

Figure 8:
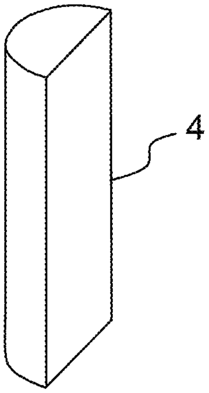
FIGS. 8, 9, 10 and 11 illustrate different steps of the rasterization process.

FIG. 8 illustrates an example of a modified 3D model 4, before its conversion into a 2D visible wireframe.

Figure 9:
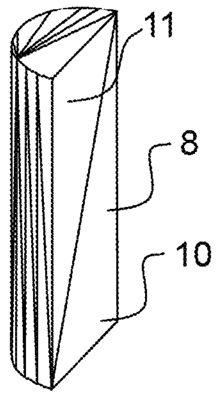

The conversion of the modified 3D model 4 into a 2D visible wireframe 5 is advantageously done by firstly performing a tessellation of the modified 3D model 4, thereby obtaining a 3D mesh 8 (illustrated by FIG. 9).

Tessellation comprises dividing each polygon corresponding to a face of the modified 3D model 4, which is defined by the points $\hat{p_i}$ of the edited primitive and by the extrusion vector $\hat{h}$ of the edited primitive, into suitable structures for rendering. More particularly for real-time rendering, each polygon is tessellated into triangles, as illustrated by FIG. 9. State of the art methods can be used for the tessellation operation. The 3D models are defined by a linear extruded section, the sections being usually convex. Therefore, the tessellation task is very simple, with a limited calculation cost. Sections comprising arcs or curves need to be discretized it into multiple vertices.

Figure 10:
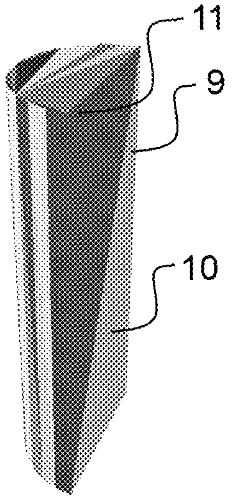
Figure 11:
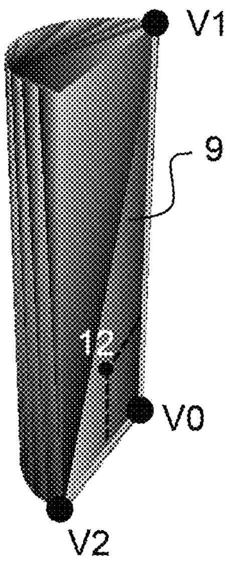

Then, sub-step c2) comprises performing a differentiable rasterization of the 3D mesh, which returns image fragments based on the 3D mesh and based on the camera parameters. It is reminded that a fragment is the data necessary to generate a single pixel. The differentiable rasterization is illustrated by FIGS. 10 and 11.

Each vertex of the 3D mesh may be expressed by a linear combination of the parameters of the primitive. As a consequence, the offsets may be optimized by optimizing the mesh vertices.

The differentiable rasterization of the 3D mesh may be performed by using PyTorch3D.

PyTorch3D, as a differentiable model, not only allows to have the 2D pixel to 3D point link (necessary link for optimization) but also provides solutions that allow a stable and feasible optimization. Indeed, Pytorch3D slightly blurs/smears the triangles of the mesh. Therefore, a pixel belongs to several triangles of the mesh (neighboring triangles and those behind). Thus, discontinuities are avoided during optimization.

Any alternative differentiable rasterizer could be used, such as Nvdiffrast for example. Any solution which allows for every 2D pixel to retrieve the 3D points corresponding to the face it belongs to could be used.

FIGS. 10 and 11 illustrate how a differentiable renderer might enable a retrieval of the link between a pixel on screen and the 3D vertices which were used to produce it.

As it can be seen on FIG. 10, the differentiable rasterization firstly (sub-step ss1) comprises rendering each triangle (10, 11) of the 3D mesh by using a unique color. Each unique color is converted into a RGB (Red, Green, Blue) index. Each parameter (red, green, and blue) defines the intensity of the color with a value between 0 and 255.

Therefore, it can be determined that all pixels of a certain color belong to the same triangle, generated from the same three vertices. Each pixel color corresponds to a triangle identifier, which corresponds to three 3D vertices of the triangle.

Then, as it can be seen on FIG. 11, the differentiable rasterization secondly (sub-step ss2) comprises expressing each pixel of each triangle in barycentric coordinates, in a basis formed by the vertices (V0, V1, V2) of the corresponding triangle.

For each triangle, one of the vertices, referred to as first vertex V0, is rendered in a first color (for example in black). Another vertex of the triangle, referred to as second vertex V1, is rendered in a second color (for example in red). The third vertex of the triangle, referred to as third vertex V2, is rendered in a third color (for example in green).

Thanks to the interpolation naturally occurring during the rasterization process, each pixel of a triangle has a unique color, and it is expressed in barycentric coordinates, in the basis formed by the first vertex V0 which serves as an origin of the basis, and the axes defined by the second vertex V1 (vector formed by the first vertex V0 and the second vertex V1) and the third vertex V2 (vector formed by the first vertex V0 and the third vertex V2). In another embodiment, the basis could also be defined with the second vertex V1 or with the third vertex V2 as an origin.

Thus, in a given triangle, each pixel color corresponds to a position of the pixel relative to the vertices of the triangle.

Therefore, by combining sub-steps ss1) and ss2), it is possible to express a pixel according to the parameters ($\hat{p_i}$, $\hat{h}$) of the 3D model, each parameter being expressed by means of the tunable offsets.

In summary, given camera parameters and a mesh, the differentiable rasterization of the 3D mesh returns image fragments from the rasterization computation. In other words, for each image pixel which is displayed on the screen (see for example pixel 12 in FIG. 11), the identifier of the visible face of the 3D mesh at this pixel is provided (or a constant negative value, for example −1, if the mesh is not visible at the corresponding pixel). The barycentric weights of the three vertices of the face are also provided: using these three weights and the three-face vertices coordinates, a 3D point can be obtained. This 3D point corresponds to the visible 3D point belonging to the mesh and which projects to this pixel.

Thus, thanks to the differentiable rasterization, each image fragment, which is associated to a pixel, comprises:

- the data which are necessary to calculate the RGB intensity of the pixel;
- an identifier of the triangle of the 3D mesh;
- barycentric coordinates of the pixel in the triangle it belongs to;
- the normal component of the triangle.

Then, a shading of the 3D mesh can be performed, which comprises obtaining the visible outer edges 7 and the visible inner edges 6 of the 3D mesh (cf. FIG. 14), without the hidden lines. Indeed, hidden lines are not visible by the user, thus they should not be included in the optimization process.

Figure 12:
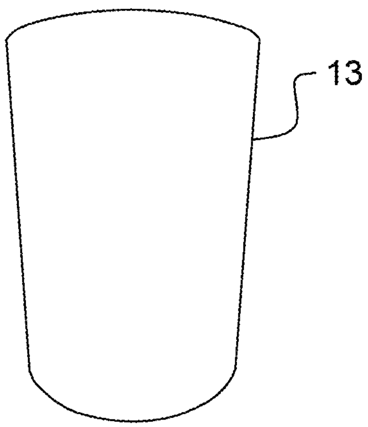
FIGS. 12, 13 and 14 illustrate different steps of the shading process.

Indeed, it is easy to get the silhouette mask (background/foreground) based on image fragments: each pixel is in the foreground if its associated fragment face is not −1. Using an edge detector (Sobel 2D convolutions for example), the 2D silhouette contour 13 can be obtained, as illustrated by FIG. 12. However, it is not enough to have a wireframe rendering of the 3D mesh, because the visible inner contours of the 3D mesh are not computed at this stage.

In order to get every visible contour (inner and outer edges), the gradients between the normal component of each pixel are computed so as to determine the variability of the direction of the normal component at each image fragment. It is reminded that the normal component is stored for each image fragment.

Figure 13:
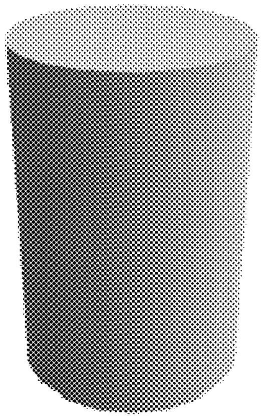

To this end, a method consists in associating for each pixel a color according to its normal (with the color components red, green and blue corresponding to the normal components nx, ny and nz in the world coordinate space $R_w$.), as illustrated by FIG. 13. Then, standard gradient-based strategies can be used to detect contours. Finally, a detected contour is in fact a visible contour.

Once the 3D mesh is rendered, an edge detection algorithm can be applied to detect the inner edges 6, as illustrated by FIG. 14.

Therefore, a list of the following elements is obtained:

- A list of identifiers of the triangles [t1, t2, . . . , tn];
- A list of barycentric coordinates [(p11, p12, p13), . . . , (pn1, pn2, pn3)];
- A list of normal components [(n11, n12, n13), . . . , (nn1, nn2, nn3)].

The 2D wireframe rendering is a 2D binary mask (it is the result of the union of two edge detection images, i.e., the images of the outer edges and the images of the inner edges), which provides the 2D coordinates of the 2D points belonging to the foreground of the 2D wireframe.

It is important to note that the discrete 2D coordinates of the foreground pixels of the 2D wireframe could be obtained by getting directly the indices of the foreground pixels. Yet, the link between these 2D coordinates and the vertices of the 3D mesh would be lost, making it impossible to optimize the mesh by using these 2D coordinates.

Thanks to the aforementioned method, each 2D point is computed from the projection (a matrix operation) of a linear combination of 3D mesh vertices, wherein each mesh vertex is a linear combination of the CAD parameters of the primitive. Thus, it is possible to optimize the offsets by optimizing the position of the 2D points. It is important to note that, contrary to the prior art methods, the 3D mesh is not optimized; it is rather used for generating the 2D wireframe, and the optimization is only done by modifying the parameters of the section and the extrusion vector.

As illustrated by FIG. 1, the invented method comprises, at each iteration, a step c3) which comprises computing an energy made of a first term which penalizes an inconsistency between the modified 3D model 4 and the initial 3D model 1, and a second term which penalizes a mismatch between the 2D visible wireframe 5 and the user sketch 3. After each iteration, the parameters are modified so as to minimize the energy.

The first term encourages the aforementioned offsets to be close to zero. Indeed, to keep consistency between the original primitive and the edited one, most of the offsets may be equal to zero (which means that there is no change from the original primitive, the 3D models are consistent one to the other). "Consistency" refers to the fact that the geometrical shape remains the same (for example a cube remains a cube, a cylinder remains a cylinder, a pyramid remains a pyramid), but the dimensions may change.

According to an embodiment, the first term, which is referred to as offset regularization energy, is computed as follows:

$$e_{offsets} = \frac{e_1}{l_h} + \frac{e_2}{l_{side}} + \frac{e_3}{l_h} + K\sqrt{e_1 * e_2 + e_1 * e_3 + e_2 * e_3 + \varepsilon}$$

$$\text{wherein } e_1 = o_n^2 \;\; e_2 = \sum \left(o_{i,u}^2 + o_{i,v}^2\right) \;\; e_3 = (o_h - o_n)^2$$

$$l_h = \|h\|^2 \quad l_{side} = \frac{1}{nbSides} \sum_{i=0}^{nbSides} \|p_{(i+1)\% nbSides} - p_i\|^2$$

- nbSides corresponds to the number of edges of the section of the initial 3D model, % nbSides corresponds to a "modulo" numbering, ε is determined to prevent a non-differentiability of the square root for the first iterations, $p_i$ corresponds to a position of the point.
- $o_{i,u}$ corresponds to a first offset of the point $p_i$ along vector u.
- $o_{i,v}$ corresponds to a second offset of the point $p_i$ along vector v.
- $o_n$ corresponds to a third offset of the point $p_i$ along vector n, said third offset $o_n$ being identical for all the points $p_i$ of the section.
- $o_h$ corresponds to a fourth offset of the scale of the extrusion vector.

Minimizing the first term means looking for a solution that minimizes the offsets, being kept in mind that the optimal solution is usually the simplest one in term of offset changes.

$$\frac{e_1}{l_h}$$

corresponds to relative section plane translation in the direction of its normal. $e_1$ is a squared value so as to get a positive value at each iteration, since the energy is to be minimized. $l_h$ corresponds to the length of the extrusion vector.

$$\frac{e_2}{l_{side}}$$

corresponds to a relative modification of the points of the section within the plane. $l_{side}$ corresponds to the mean length of a segment, between two points $p_i$ of the section. For example, for a four-point section ($p_1$, $p_2$, $p_3$, $p_4$), $l_{side}$ is computed as follows:

$$l_{side} = \frac{1}{4}(\|p_2 - p_1\|^2 + \|p_3 - p_2\|^2 + \|p_4 - p_3\|^2 + \|p_1 - p_4\|^2$$

$$\frac{e_3}{l_h}$$

corresponds to a relative modification of the scale of the extrusion vector.

The first term $e_{offsets}$ is a sum of quadratic energies, and minimizing a sum of quadratic elements tends to split the errors into each different element. This is not the desired behavior because it usually leads to non-plausible results in terms of user intentionality.

Indeed, it is unlikely that the user edits the extrusion direction length and the section plane/section points using a single stroke. It is also unlikely that he edits the points of the section and the plane of the section at the same time. Because of the interactivity of the invented method, the 3D model is edited iteratively, after each user stroke, and one single stroke usually means a minor modification.

That is why the term $$K\sqrt{e_1 * e_2 + e_1 * e_3 + e_2 * e_3 + \varepsilon}$$

has been added; it highly penalizes the simultaneous modifications. Indeed, the term is equal to zero when at least two of the energies $e_1$, $e_2$ and $e_3$ are equal to zero.

In an embodiment, $1 \leq K \leq 10^6$ and $\varepsilon \leq 10^{-6}$.

A too high K coefficient ($10^9$ for example, or even $10^6$) would make the optimization unstable (the term becomes too overwhelming compared to other energies, especially since floating values are handled: there are no values which are strictly equal to zero). Thus, it is acceptable to lower K in order to accept minor errors of floats (two terms very slightly non-zero).

Consequently, $K=10^3$ is a good trade-off.

Advantageously, $\varepsilon \leq 10^{-6}$, for example $\varepsilon \leq 10^{-8}$, in order to prevent non differentiability (a square root is not differentiable at zero for the first iterations).

The energy to be minimized comprises a second term, referred to as custom Chamfer energy, which penalizes a mismatch between the 2D visible wireframe 5 and the user sketch 3.

In what follows, the foreground points (pixels) of the 2D wireframe 5 are called the "rendered 2D points"; and the points (pixels) of the user sketch 3 are called the "target 2D points".

Figure 15:
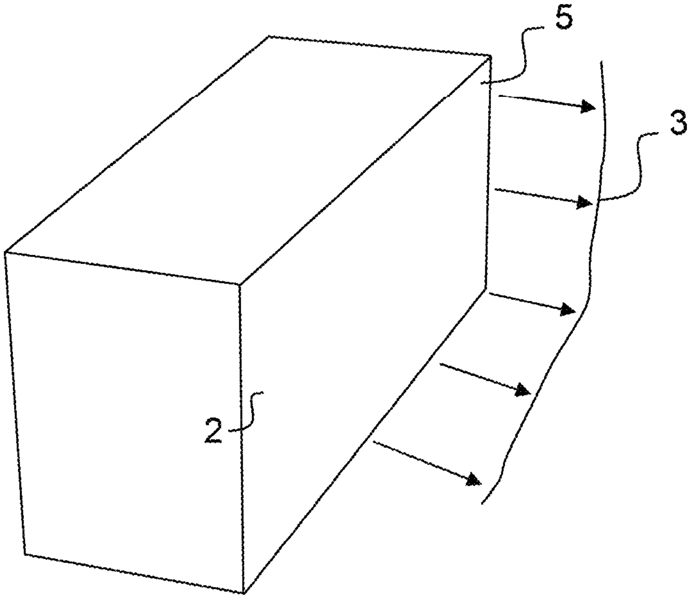
FIGS. 15, 16 and 17 illustrate the computing of the custom Chamfer energy.

The idea is to iterate over each 2D target point 3 and minimize the distance between that point 3 and the closest 2D point from the rendered 2D points list 5. All target points should "attract" (i.e., reduce the distance) closest point from the other list points, as illustrated by FIG. 15.

The notion of "close" points depends on a distance metric, which is usually the L2 norm in the prior art. However, in the present case, it has been pointed out that a L2 norm (or L2 distance) is not well suited in all situations to find the correct rendered point to attract, as illustrated by FIG. 16.

Figure 16:
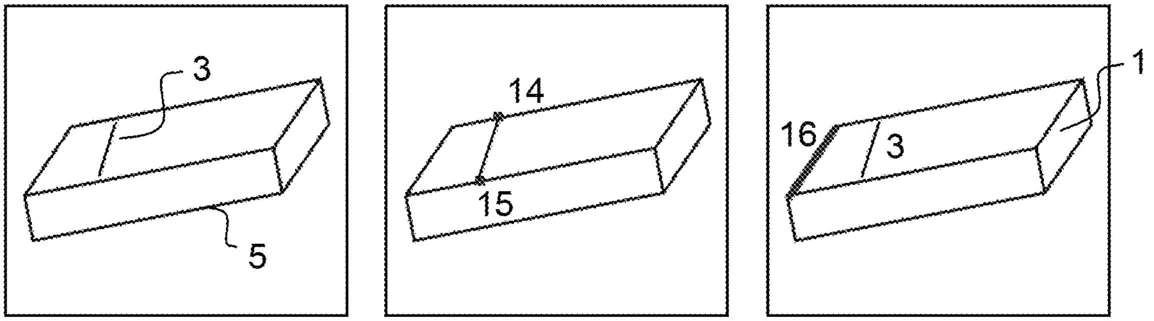

On the left part of FIG. 16, the 2D rendered points 5 are displayed along with the 2D target points 3 which should "attract" the 2D rendered points 5.

On the middle part of FIG. 16, the closest 2D rendered point of each 2D target point, using the L2 norm, are concentrated in the areas 14 and 15, which does not correspond to the user's intention.

Indeed, on the right part of FIG. 16, the segment 16 corresponds to the correct rendered points which should be "attracted" and which should match the user target stroke 3. Here there is no ambiguity about this user intention, because it would be a nonsense (and would not respect the idea of simplest solution stated before) to attract rendered points belonging to an orthogonal edge to the target stroke line.

Since the well-known L2 distance is not satisfying for computing the distance between the rendered 2D points and the target 2D points, the invented method advantageously comprises computing a distance which is particularly well adapted to the present case.

Indeed, the user strokes are seen as a set of lines which must attract close parallel contours. The computed distance incorporates more meaning into the input rather than a set of 2D target points which are all isolated and independent one to each other.

Figure 17:
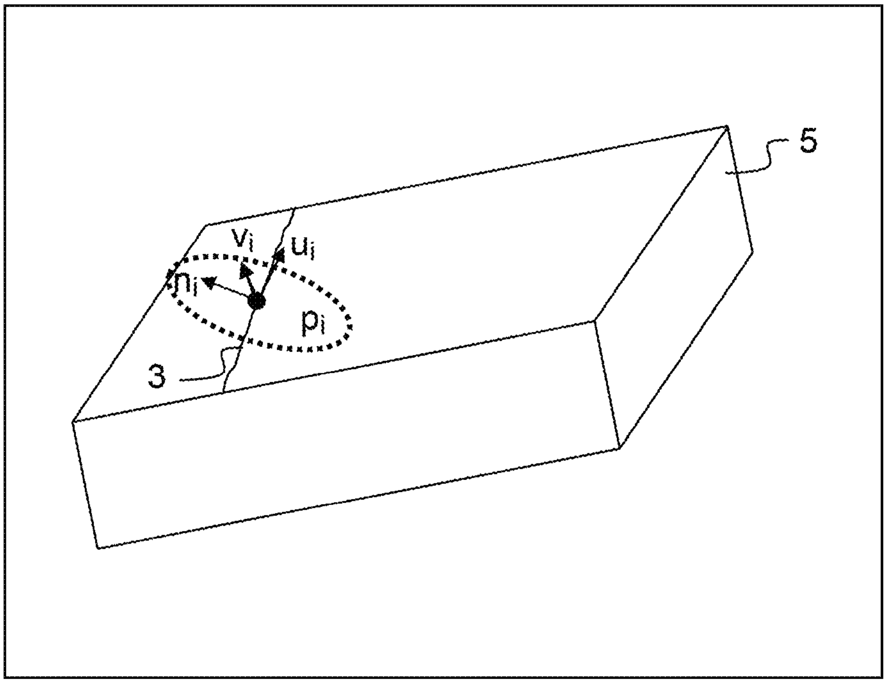
Figure 18:
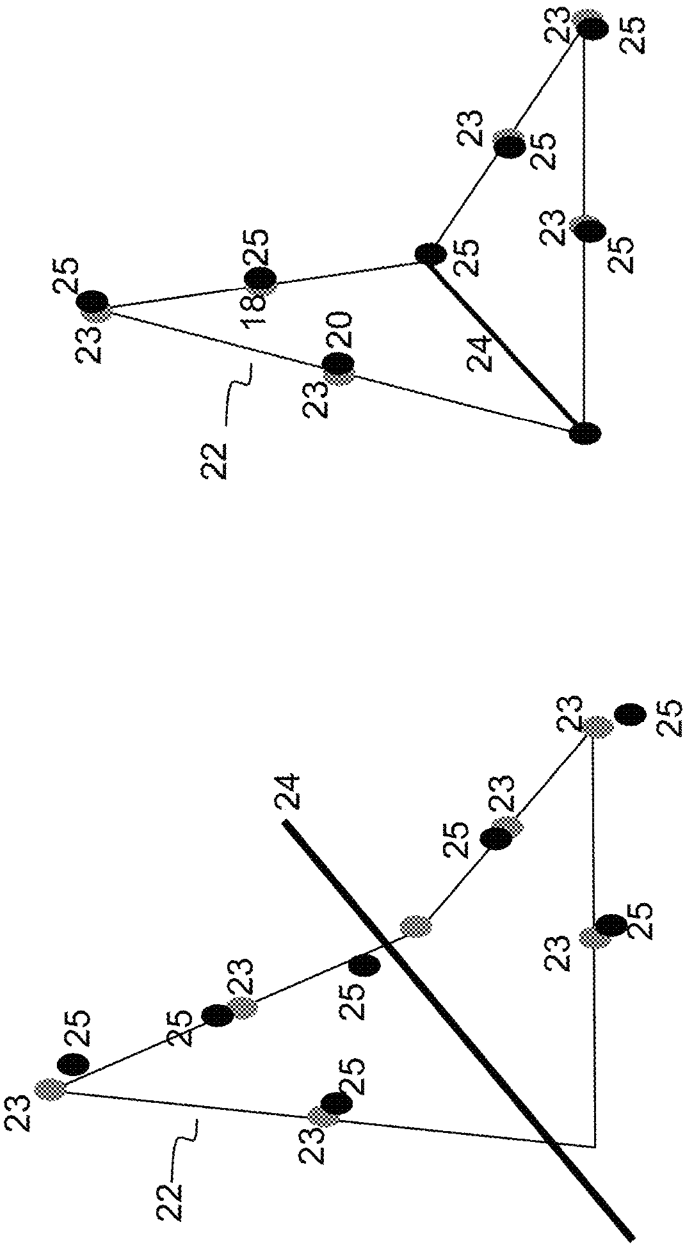
FIG. 18 illustrates the computing of the symmetry energy.

FIGS. 17 and 18 illustrate this embodiment. For each 2D target point $pix_i$, its 2D local stroke direction $u_i$ is approximated, using its target 2D points neighbors (two points of the user sketch 3 which pass by the point of the user sketch $pix_i$). $n_i$ is orthogonal to $u_i$ at the point $pix_i$, thereby forming a local 2D orthonormal system ($pix_i$; $u_i$, $n_i$).

For each target point $pix_i$, a local 2D coordinate system ($pix_i$; $u_i$, $n_i$) is defined, with $n_i$ being orthogonal to $u_i$ (in a plane which is orthogonal to the viewpoint).

The 2D local stroke direction which extends through two points of the user sketch (3) which pass by the point of the user sketch $pix_i$, define the 2D local stroke direction $u_i$. $n_i$ is orthogonal to $u_i$ at the point $pix_i$, thereby forming a local 2D orthonormal system ($pix_i$; $u_i$, $n_i$).

Then, for each point of the user sketch $pix_i$, the distance between the point $pix_i$ and each point of the rendered 2D points of the visible 2D wireframe is computed. The distance which is used with the invented method is defined in such a way that the rendered 2D points of the visible 2D wireframe which are not part of the user sketch are closer than the rendered 2D points of the visible 2D wireframe which are also points of the user sketch (cf. points 14 and 15 on the middle part of FIG. 16).

$$d(pix_i, pix_k)^2 = \lambda * (pix_k, u_i)^2 + (pix_k, n_i)^2$$

Therefore, the distance between points over the local direction of the stroke $u_i$ is increased when $\lambda > 1$. A target stroke line will attract a parallel primitive line.

Then the custom Chamfer energy $e_{chamfer}$ is computed as follows:

$$e_{chamfer} = \frac{1}{n} \sum_{pix_i \in L_{target}} \min_{pix_k \in L_{rendered}} d(pix_i, pix_k)^2$$

n corresponds to the number of points $pix_i$ of the user sketch 3.

$pix_i$ corresponds to a point of the user sketch 3, and $L_{target}$ corresponding to the whole set of n points $pix_i$ of the user sketch 3.

$pix_k$ corresponds to a point of the 2D visible wireframe 5 and $L_{rendered}$ corresponds to the whole set of points $pix_k$ of the 2D visible wireframe 5.

$\lambda$ is a scalar such that $\lambda>1$. Indeed, with $\lambda>1$, the points which are on the parallel to the user sketch are privileged for computing the custom Chamfer energy $e_{chamfer}$.

Advantageously. $2\leq\lambda\leq20$, and $\lambda=4$.

If $\lambda$ is too low (for example $1\leq\lambda\leq2$), the 2D local stroke direction $u_i$ will not be enough penalized. If $\lambda$ is too high, there may be instabilities in view of noise of the local normal $n_i$, which may slow down the real time computations.

Thanks to the normalization factor $$\frac{1}{n},$$

the custom Chamfer energy $e_{chamfer}$ does not depend on the size of the sketch. Besides, the energies are easily compared one to the others, since they all have the same order of magnitude, which is beneficial for the calculation of the gradient during the optimization.

It has been seen that, at each iteration of the invented method, an energy is computed. The energy comprises a first term (the offset regularization energy) which penalizes an inconsistency between the modified 3D model (4) and the initial 3D model (1), and a second term (the custom Chamfer energy) which penalizes a mismatch between the 2D visible wireframe (5) and the user sketch (3); Optionally, the energy may also comprise a third term, referred to as projection regularization energy which is computed as follows:

$$e_{projection} = 1 - \text{mean}\left(\frac{\text{Mask}_1 * \text{Mask}_2}{\text{Mask}_1 + \text{Mask}_2 - \text{Mask}_1 * \text{Mask}_2}\right)$$

$\text{Mask}_1$ is a first binary mask of the projection, on a plane perpendicular to the sight of view direction, of the initial 3D model. $\text{Mask}_2$ is a second binary mask of the projection, on a plane perpendicular to the sight of view direction, of the modified 3D model. Operators "*" and "+" are a pixel-wise operators. "mean" corresponds to the mean pixel value of an image. It can be noted that $\text{Mask}_1$ and $\text{Mask}_2$ can be switched, since the operators "*" and "+" are symmetric functions.

The projection regularization energy represents the Intersection Over Union loss between two images. It consists in comparing the foreground/background mask of the projection of the initial 3D model with the modified 3D model.

The regularization energy penalizes the pixel differences. Like the offset regularization energy, the idea is to keep consistency between the both 3D models. Using a 2D projection of the primitives gives a real visual aspect feedback, unlike the numerical offsets that do not take into account the camera parameters. Indeed, a same non-zero offset can have a small or high effect on the primitive aspect following the current viewpoint.

Optionally, the energy may also comprise a fourth term referred to as symmetry energy which penalizes a lack of symmetry of the modified 3D model, and which increase the plausibility of the modified 3D model.

Man-made objects are usually composed of symmetric and regular primitives. Indeed, it is more common to find cylindrical man-made objects than elliptic objects; rectangular shapes rather than arbitrary quadrilateral shapes.

The symmetry energy may be computed as follows:

$$e_{symmetry} = \min_{q\in Q}\left(\sum \min_{\widehat{p'_{j,q}}\in\widehat{P'_q}} \|\widehat{p_i} - \widehat{p'_{j,q}}\|^2 + \sum \min_{\widehat{p_i}\in\hat{P}} \|\widehat{p_i} - \widehat{p'_{j,q}}\|^2\right)$$

P is a set of points including the vertices of the section and the middle point between two consecutive vertices.

Q is a set of symmetry plane candidates which are all the planes containing two different points of P, and with normal orthogonal to the normal of the section.

$\hat{P}$ is the set of points containing all points $(p_i)$ of the section of the initial 3D model and all the extruded points $(\widehat{p_i}, +\hat{h})$.

Given the set of points P and a plane q defining a symmetry, the set of symmetric points $(\widehat{P}'_q)$ is computed, where $\widehat{P_{1,q}}'$ is the symmetric point of $\hat{P}_i$, using the symmetry plane q.

In the example of FIG. 18 (left part), the contours 22 of the section of the 3D model (here a quadrilateral) are to be optimized. The set of points P comprises the points 23. The line 24 represents the axis of the best plane of symmetry Q. The points 25 are the set of points P. The right part of FIG. 18 illustrates the optimized 3D model by the symmetry energy. The set points of points P and P all merge, which means that the symmetry energy has been minimized, meaning a good symmetry with respect to the axis 24.

Finally, the energy to minimize is equal to the sum of at least the first and second terms, and potentially also the third and fourth terms:

$$e = k_{chamfer} * e_{chamfer} + k_{offsets} * e_{offsets} + k_{projection} * e_{projection} + k_{symmetry} * e_{symmetry}$$

$k_{chamfer}$, $k_{offsets}$, $k_{projection}$ and $k_{symmetry}$ are weights which are determined so as to balance between regularization energies ($e_{offsets}$, $e_{projection}$ and $e_{symmetry}$) and target energy ($e_{chamfer}$).

According to a particular embodiment, the following weights can be used:

$$k_{chamfer} = 10^3$$

$$k_{offsets} = 10^{-1}$$

$$k_{projection} = 1$$

$$k_{symmetry} = 10^{-1}$$

As mentioned above, each energy can be expressed using inputs (original CAD parameters of the extrusion, camera parameters and user sketch) and offsets. In addition, each performed operation is differentiable (rasterization, shading, matrix operations, . . . ). Thus, at each iteration, the energy and the offsets are determined, and it is possible to minimize the energy e by performing a gradient descent optimization compute $$\frac{\partial e}{\partial o}$$

where o is any offset.

The learning rate parameter of the descent (or descent rate) is adapted to match the scale of the primitive. For that, the following descent rate DR can be used $$DR = \frac{1}{\alpha} * \frac{l_{side} + l_h}{2}$$

$l_{side}$ corresponds to the mean length of the section sides of the initial 3D model and $l_h$ corresponds to the length of the extrusion vector of the initial 3D model. α is a scalar.

In an embodiment, $1 \le \alpha \le 10^6$, $5 \le \alpha \le 10^4$, $10 \le \alpha \le 10^3 \le 20 \le \alpha \le 100$, for example α=50.

It is possible to have a low learning rate parameter during the optimization, so as not to vary the offsets too suddenly.

The invented method comprises a plurality of iterations of steps c1), c2) and c3). The parameters are modified after each iteration, so as to minimize said energy. Thus, the offsets are updated using the gradient descent step results. The number of iterations may be predetermined (for example 200, which has empirically proven to be very satisfying), or the iteration may stop if one or several predetermined criteria has been met.)

Finally, the edited CAD parameters are stored, so that the modified 3D model can be further used in a CAD software.

Because of the interactivity of the invented method, the 3D model is edited iteratively, after each user stroke, and one single stroke usually means a minor modification.

The method comprises a last step d) which comprises displaying the modified 3D model (cf. FIG. 1). The modified 3D model may be displayed continuously after each iteration, or at the end of all the iterations.

It can be noted that the shape modification is not limited to a single view. As the user draws, the original sketch as well as the inferred 3D model can be projected to any other arbitrary or selected view, therefore helping the user refining the final design by starting the drawing from one point of view and ending it from another.

Figure 19:
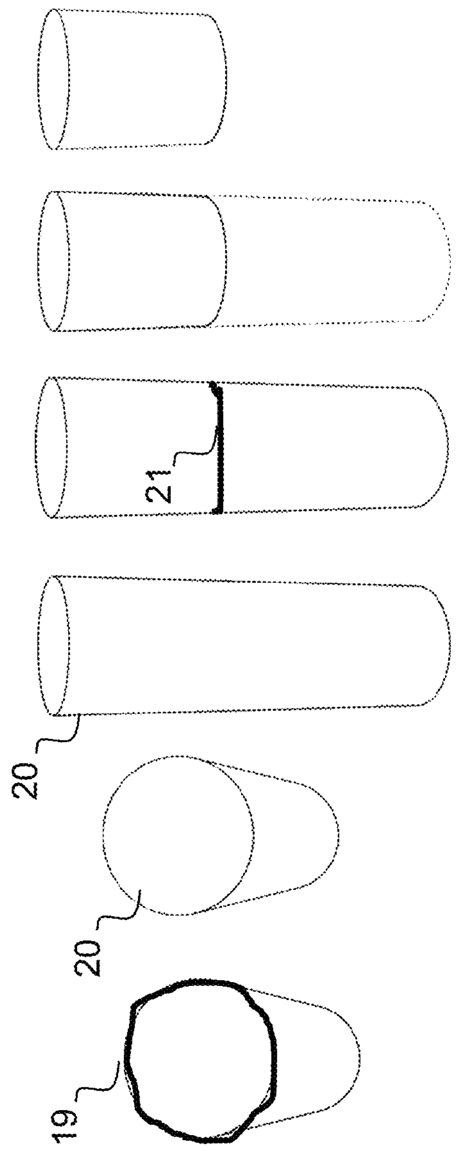
FIG. 19 illustrates the invented method from different viewpoints.

For example, in FIG. 19, the user draws a circle 19 according to a first view, thus a cylinder 20 is inferred. However, according to that first view, it would be difficult for the user to precisely modify the height of the cylinder. Then, the user changes the view; the user sketch can be provided according to that second view in order to refine the shape. The inferred shape is shrunk (cf. user sketch 21) to better fit to the strokes.

The method has been disclosed in particular for a linear extrusion of a plane section, with an extrusion vector which is always orthogonal to the section plane.

However, the method can be extended to a section composed of multiple curves, with the line type list containing the different degrees of the curves. It is also possible to consider non-planar sections and extrusion vectors that are not orthogonal to the section plane.

In particular, the invented method is also particularly well adapted for a surface of revolution, which is considered as a curved extrusion (extrusion by revolution). The left part of FIG. 19 illustrates a planar section comprising a list of 3D points ($p_0$-$p_6$), and the axis of revolution is defined by a vector $h = p_{h_1} - p_{h_0}$, wherein $p_{h_0}$ and $p_{h_1}$ belong to the plane of the section on the axis of revolution.

It can be seen that connections $p_0$-$p_1$, $p_2$-$p_3$, $p_3$-$p_4$, $p_4$-$p_5$ and $p_6$-$p_0$ are segments and connections $p_1$-$p_2$ and $p_5$-$p_6$ are arcs. It is supposed that the connection types (segment or arc) do not change during the design process.

Figure 20:
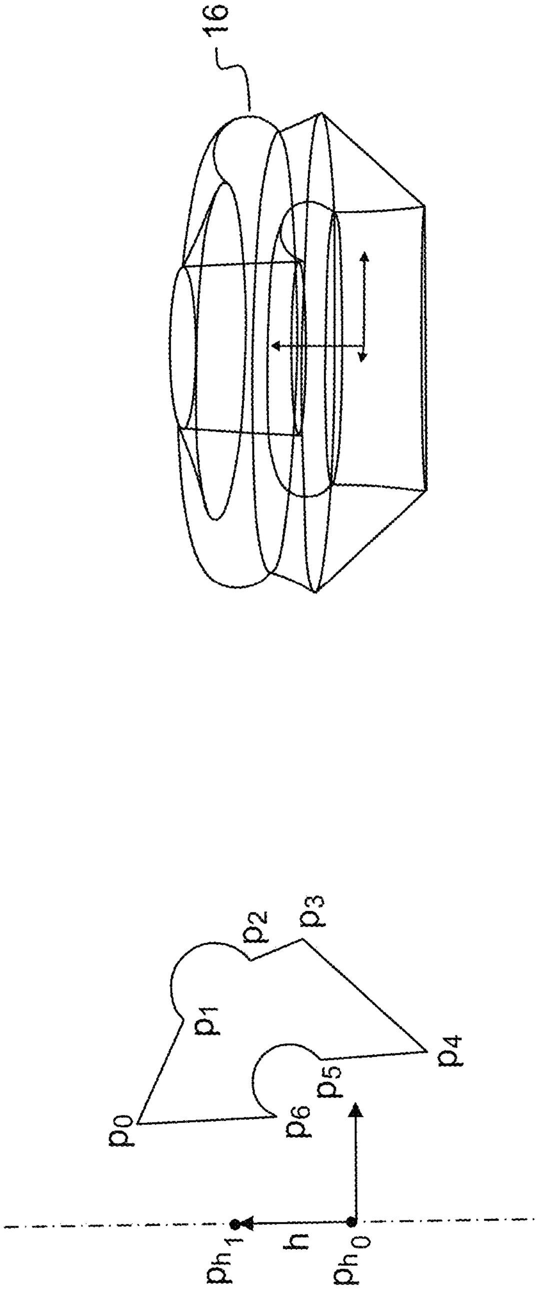
FIG. 20 illustrates an embodiment of the invention for the edition of revolve surfaces.

The right part of FIG. 20 illustrates the solid of revolution (initial 3D model) which is obtained by rotating the planar section $p_0$-$p_6$ around the axis of revolution defined by vector h.

The modified 3D model can be defined with regards to the initial 3D model by a modified set of points $\hat{p_i}$ which correspond to the modified planar section of the modified solid of revolution (modified 3D model):

$$\hat{p}_i = p_i + o_{i,u}u + o_{i,v}v,$$

u, v correspond to vectors which define a plane of the planar section, $o_{i,u}$ and $o_{i,v}$ correspond to offsets to optimize;

Besides, the modified positions of the points $\widehat{p_{h_0}}$ and $\widehat{p_{h_1}}$ which correspond to the modified axis of revolution can be defined as follows:

$$\hat{p_{h_0}} = p_{h_0} + o_{h_0,u}u + o_{h_0,v}v$$

$$\hat{p_{h_1}} = p_{h_1} + o_{h_1,u}u + o_{h_1,v}v,$$

$o_{h_0,u}$, $o_{h_0,v}$, $o_{h_1,u}$, $o_{h_1,v}$ correspond to offsets to optimize.

At each iteration of the method, the modification at least one of the parameters of the 3D model comprises modifying one of the offsets $o_{i,u}$, $o_{i,v}$, $o_{h_0,u}$, $o_{h_0,v}$, $o_{h_1,u}$, $o_{h_1,v}$.

According to that embodiment, steps a), b), c1) and c2) are the same as for a linear extrusion, and will not be detailed for the sake of brevity.

In step c3), the first term (offset regularization energy), is computed as follows:

$$e = \frac{e_1}{l_h} + \frac{e_2}{l_{side}} + K\sqrt{e_1 * e_2 + \varepsilon}$$

$$e_1 = o_{h_0,u}^2 + o_{h_0,v}^2 + o_{h_1,u}^2 + o_{h_1,v}^2$$

$$e_2 = \sum \left(o_{i,u}^2 + o_{i,v}^2\right)$$

$$l_{side} = \frac{1}{nbPoints} * \sum_{i=0}^{nbPoints-1} \|p_{(i+1)\%\, nbPoints} - p_i\|^2$$

$$l_h = \|p_{h1} - p_{h0}\|^2$$

nbPoints corresponds to the number of points of the section of the initial 3D model, K is a penalization weight which is determined to penalize simultaneous modifications in the user sketch 3, ε is determined to prevent a non-differentiability of the square root for the first iterations.

The values of K and E are determined similarly as for the linear extrusion.

Besides, in step c3), the second term (custom Chamfer energy), and the third term (projection regularization energy), are identical to the second term for a linear extrusion. The fourth term (symmetry energy) is not relevant in case of a surface of revolution.

The inventive method can be performed by a suitably-programmed general-purpose computer or computer system, possibly including a computer network, storing a suitable program, optionally in non-volatile (i.e., non-transitory) form, on a computer-readable medium such as a hard disk, a solid state disk or a CD-ROM and executing said program using its microprocessor(s) and memory.

Figure 21:
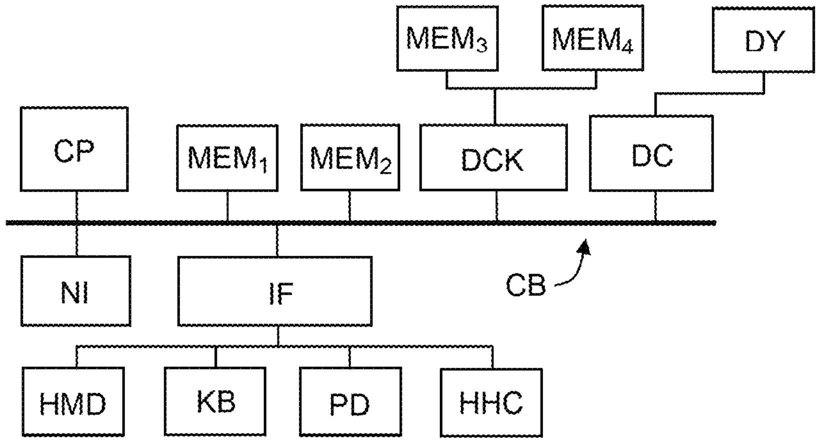
FIG. 21 illustrates a computer for carrying out the invented method.

A computer—more precisely a computer aided design station—suitable for carrying out a method according to an exemplary embodiment is described with reference to FIG. 21. In FIG. 21, the computer includes a Central Processing Unit CP which performs the processes described above. The process can be stored as an executable program, i.e., a set of computer-readable instructions in memory, such as RAM MEM1 or ROM MEM2, or on hard disk drive (HDD) MEM3, DVD/CD drive MEM4, or can be stored remotely. 3D models database in a form suitable to be processed by the executable program according to the inventive method—may also be stored on one or more of memory devices MEM1 to MEM4, or remotely.

The claimed invention is not limited by the form of the computer-readable media on which the computer-readable instructions of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the database can be stored on a same memory device or on different memory devices.

Further, a computer program suitable for carrying out the inventive method can be provided as a utility application, background daemon, or component of an operating system, or combination thereof, executing in conjunction with CPU PR and an operating system such as Microsoft VISTA, Microsoft Windows 7, UNIX, Solaris, LINUX, Apple MAC-OS and other systems known to those skilled in the art.

The Central Processing Unit CP can be aXenon processor from Intel of America or an Opteron processor from AMD of America, or can be other processor types, such as a Freescale ColdFire, IMX, or ARM processor from Freescale Corporation of America. Alternatively, the Central Processing Unit CP can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 21 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor or a virtual reality headset. A general purpose I/O interface IF interfaces with a keyboard KB and pointing device PD, such as a roller ball, mouse, touchpad, control devices of a virtual reality system and the like. The display, the keyboard and the pointing device, together with the display controller and the I/O interfaces, form a graphical user interface.

The disclosure may also be implemented in touch mode, wherein a computer system comprises a touch sensitive display for displaying the 3D scene and detecting interactions of one the appendages.

The user sketch is provided by means of the pointing device PD, which can also be an appendage such as a stylus or the user's finger. The user sketch can be seen on the display DY.

Disk controller DKC connects HDD MEM3 and DVD/CD MEM4 with communication bus CB, which can be an ISA, EISA, VESA, PCI, or similar, for interconnecting all of the components of the computer aided design station.

The computer also comprises a memory having recorded thereon the data structure which comprises the Convolutional Neural Network (CNN) encoder which infers the 3D primitive based on the 2D sketch and based on the learned patterns. The skilled person may refer to patent application EP3958162A1 for an exemplary description of the encoder.

The modified 3D model may be stored on CDs, DVDs, in FLASH memory, RAM, ROM, PROM, EPROM, EEPROM, hard disk or any other server or computer, for a further use in a computer aided design. A physical (mechanical) object, or a part of said object, may be manufactured based on a file containing the modified 3D model. The file may be converted in a readable format for the manufacturing process. Thus, the disclosure also relates to a method of manufacturing a mechanical part, which comprises the steps of:

Designing a mechanical part by means of the aforementioned design method;

Physically manufacturing the mechanical part.

A description of the general features and functionality of the display, keyboard, pointing device, as well as the display controller, disk controller, network interface and I/O interface is omitted herein for brevity as these features are known.

Figure 22:
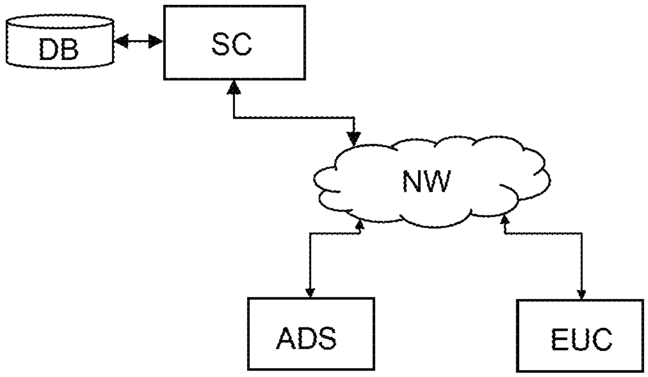
FIG. 22 illustrates a block diagram of a computer system suitable for carrying out a method.

FIG. 22 is a block diagram of a computer system suitable for carrying out a method according to a different exemplary embodiment.

In FIG. 22, the server SC is connected to an administrator system ADS and end user computer EUC via a network NW.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses the 3D model databases on the server via the network NW.

Although only one administrator system ADS and one end user system EUX are shown, the system can support any number of administrator systems and/or end user systems without limitation.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment.

The invention claimed is:

1. A computer-implemented method for designing a 3D model, comprising:

a) obtaining an initial 3D model in a 3D scene, the initial 3D model including at least one extruded section, said at least one extruded section being defined by a set of parameters;

b) receiving a user sketch on a plane perpendicular to a sight of view direction;

c) at each iteration of a plurality of iterations:

c1) modifying at least one of said parameters, thereby obtaining a modified 3D model;

c2) performing a perspective projection, on the plane perpendicular to the sight of view direction, of the modified 3D model, thereby obtaining a 2D visible wireframe, said 2D visible wireframe including visible inner and outer edges of the modified 3D model; and c3) computing an energy which including a first term which penalizes an inconsistency between the modified 3D model and the initial 3D model, and a second term which penalizes a mismatch between the 2D visible wireframe and the user sketch, said parameters being modified to minimize said energy; and d) outputting the modified 3D model.

2. The method according to claim 1, wherein, the initial 3D model comprising at least one linear extruded section, said linear extruded section being defined by the set of parameters including a position of 3D points ($p_i$) of the linear extruded section in the 3D scene and an extrusion vector (h), the modified 3D model is defined with regards to the initial 3D model by a modified set of points $\hat{p}_i$ and by a modified extrusion vector $\hat{h}$ expressed as follows:

$$\hat{p}_i = p_i + o_{i,u}u + o_{i,v}v + o_n n$$

$$\hat{h} = h + (o_h - o_n)n,$$

wherein $p_i$ correspond to the set of points of the linear extruded section, and h corresponds to the extrusion vector of the initial 3D model expressed in a coordinate space $R_w$ of the 3D scene;

u,v correspond to vectors which define a plane of the linear extruded section, and n is a normal to said u,v vectors; wherein:

$o_{i,u}$ corresponds to a first offset of the point $p_i$ along vector u, $o_{i,v}$ corresponds to a second offset of the point $p_i$ along vector v, $o_n$ corresponds to a third offset of the point $p_i$ along vector n, said third offset $o_n$ being identical for all the points $p_i$ of the linear extruded section;

$o_h$ corresponds to a fourth offset of a scale of the extrusion vector;

wherein modifying at least one of said parameters comprises modifying at least one among said first offset, second offset, third offset or fourth offset.

3. The method according to claim 2, wherein the first term, referred to as offset regularization energy, is computed as follows:

$$e_{offsets} = \frac{e_1}{l_h} + \frac{e_2}{l_{side}} + \frac{e_3}{l_h} + K\sqrt{e_1 * e_2 + e_1 * e_3 + e_2 * e_3 + \varepsilon}$$

$$\text{wherein } e_1 = o_n^2$$

$$e_2 = \sum\left(o_{i,u}^2 + o_{i,v}^2\right) \quad e_3 = (o_h - o_n)^2$$

$$l_h = \|h\|^2 \quad l_{side} = \frac{1}{nbSides\sum_{i=0}^{nbSides}\|p_{(i+1)\%\ nbSides} - p_i\|^2}$$

wherein nbSides corresponds to a number of edges of the section of the initial 3D model, K is a penalization weight which is determined to penalize simultaneous modifications in the user sketch, ε is determined to prevent a non-differentiability of a square root for first iterations, $l_h$ corresponds to the length of the extrusion vector, $l_{side}$ corresponds to the mean length of a segment, between two points $p_i$ of the section.

4. The method according to claim 3, wherein the second term, being a custom Chamfer energy, is computed as follows:

$$e_{chamfer} = \frac{1}{n}\sum_{pix_i \in L_{target}} \min_{pix_k \in L_{rendered}} d(pix_i, pix_k)^2$$

$$d(pix_i, pix_k)^2 = \lambda * (pix_k \cdot u_i)^2 + (pix_k \cdot n_i)^2$$

wherein $pix_i$ corresponds to a point of the user sketch, $L_{target}$ corresponding to the whole set of points $pix_i$ of the user sketch, wherein $pix_k$ corresponds to a point of the 2D visible wireframe, $L_{rendered}$ corresponding to the whole set of points $pix_k$ of the 2D visible wireframe, wherein for each point $pix_i$ of the user sketch, $u_i$ corresponds to a 2D local stroke direction which extends through two points of the user sketch, which pass by the point of the user sketch $pix_i$, $n_i$ is orthogonal to $u_i$ at the point $pix_i$, thereby forming a local 2D orthonormal system ($pix_i$; $u_i$, $n_i$), n being a number of points of the user sketch, and wherein λ is a scalar such that λ>1.

5. The method according to claim 2, wherein the energy includes a fourth term referred to as symmetry energy $e_{symmetry}$, which is computed as follows:

$$e_{symmetry} = \min_{q \in Q}\left(\sum_{\hat{p}_i \in \hat{P}} \min_{\hat{p}'_{i,q} \in \hat{P}'_q}\left\|\hat{p}_i - \hat{p}'_{i,q}\right\|^2 + \sum_{\hat{p}_{i,q} \in \hat{P}'_q} \min_{\hat{p}_i \in \hat{P}}\left\|\hat{p}_i - \hat{p}'_{i,q}\right\|^2\right)$$

wherein P is a set of points including vertices of the section and the middle point between two consecutive vertices, wherein Q is a set of symmetry plane candidates which are all the planes containing two different points of P, and with normal orthogonal to the normal of the section, wherein $\hat{P}$ is the set of points containing all points $p_i$ of the section of the initial 3D model and all the extruded points ($\hat{p}_i + \hat{h}$), and wherein, given the set of points $\hat{P}$ and a plane q defining a symmetry, the set of symmetric points $\hat{P}'_q$ is computed, where $\hat{P}'_q$ is the symmetric point of $\hat{p}_i$, using the symmetry plane q.

6. The method according to claim 2, wherein the energy is minimized by performing a gradient descent optimization, with the following descent rate DR:

$$DR = \frac{1}{\alpha} * \frac{l_{side} + l_h}{2},$$

wherein $l_{side}$ corresponds to a mean length of section sides of the initial 3D model and $l_h$ corresponds to the length of the extrusion vector of the initial 3D model, α is a scalar.

7. The method according to claim 2, wherein the second term, being a custom Chamfer energy, is computed as follows:

$$e_{chamfer} = \frac{1}{n \sum_{pix-i} \in L_{target} \min_{pix_k \in L_{rendered}} d(pix_i, pix_k)^2}$$

$$d(pix_i, pix_k)^2 = \lambda * (pix_k \cdot u_i)^2 + (pix_k \cdot n_i)^2$$

wherein $pix_i$ corresponds to a point of the user sketch, $L_{target}$ corresponding to the whole set of points $pix_i$ of the user sketch, wherein $pix_k$ corresponds to a point of the 2D visible wireframe, $L_{rendered}$ corresponding to the whole set of points $pix_k$ of the 2D visible wireframe, wherein for each point $pix_i$ of the user sketch, $u_i$ corresponds to a 2D local stroke direction which extends through two points of the user sketch, which pass by the point of the user sketch $pix_i$, $n_i$ is orthogonal to $u_i$ at the point $pix_i$, thereby forming a local 2D orthonormal system ($pix_i$; $u_i$, $n_i$), n being a number of points of the user sketch, and wherein λ is a scalar such that λ>1.

8. The method according to claim 1, wherein, the initial 3D model describing a 3D surface of revolution, said 3D surface of revolution being defined by the set of parameters including a list of 3D points $p_i$ of a planar section to revolve, and by an axis of revolution, expressed as follows:

$$h = p_{h_1} - p_{h_0}$$

wherein $p_{h_0}$ and $p_{h_1}$ belong to the plane of the section on the axis of revolution, wherein the modified 3D model is defined with regards to the initial 3D model by a modified set of points $\widehat{p_i}$ of the planar section and by a modified vector of axis of revolution $\hat{h}$, wherein $\widehat{p_i} = p_i + o_{i,u}u + o_{i,v}v$ and $\hat{h} = \widehat{p_{h_1}} - \widehat{p_{h_0}}$ u,v corresponding to vectors which define a plane of the planar section, $o_{i,u}$ and $o_{i,v}$ corresponding respectively to a fifth and sixth offsets to optimize, and $\widehat{p_{h_0}} = p_{h_0} + o_{h_0,u}u + o_{h_o,v}v$ and $\widehat{p_{h_1}} = p_{h_1} + o_{h_1,u}u + o_{h_1,v}v$, $o_{h_0,u}$, $o_{h_0,v}$, $o_{h_1,u}$, $o_{h_1,v}$ corresponding to offsets to optimize, and wherein modifying at least one of said parameters comprises modifying at least one among said offsets.

9. The method according to claim 8, wherein the first term, referred to as offset regularization energy, is computed as follows:

$$e = \frac{e_1}{l_h} + \frac{e_2}{l_{side}} + K\sqrt{e_1 * e_2 + \varepsilon}$$

$$\text{Where: } e_1 = o_{h_0,u}^2 + o_{h_0,v}^2 + o_{h_1,u}^2 + o_{h_1,v}^2 \quad e_2 = \sum \left(o_{i,u}^2 + o_{i,v}^2\right)$$

$$l_{side} = \frac{1}{nbPoints} * \sum_{i=0}^{nbPoints-1} \|p_{(i+1)\%\ nbPoints} - p_i\|^2$$

$$l_h = \|p_{h1} - p_{h0}\|^2$$

wherein nbPoints corresponds to a number of points of the section of the initial 3D model, K is a penalization weight which is determined to penalize simultaneous modifications in the user sketch and, ε is determined to prevent a non-differentiability of a square root for first iterations, $l_h$ corresponds to the length of the extrusion vector, $l_{side}$ corresponds to the mean length of a segment, between two points $p_i$ of the section.

10. The method according to claim 9, wherein the second term, being a custom Chamfer energy, is computed as follows:

$$e_{chamfer} = \frac{1}{n \sum_{pix_i \in L_{target}} \min_{pix_k \in L_{rendered}} d(pix_i, pix_k)^2}$$

$$d(pix_i, pix_k)^2 = \lambda * (pix_k \cdot u_i)^2 + (pix_k \cdot n_i)^2$$

wherein $pix_i$ corresponds to a point of the user sketch, $L_{target}$ corresponding to the whole set of points $pix_i$ of the user sketch, wherein $pix_k$ corresponds to a point of the 2D visible wireframe, $L_{rendered}$ corresponding to the whole set of points $pix_k$ of the 2D visible wireframe, wherein for each point $pix_i$ of the user sketch, $u_i$ corresponds to a 2D local stroke direction which extends through two points of the user sketch, which pass by the point of the user sketch $pix_i$, $n_i$ is orthogonal to $u_i$ at the point $pix_i$, thereby forming a local 2D orthonormal system ($pix_i$; $u_i$, $n_i$), n being a number of points of the user sketch, and wherein λ is a scalar such that λ>1.

11. The method according to claim 8, wherein the second term, being a custom Chamfer energy, is computed as follows:

$$e_{chamfer} = \frac{1}{n} \sum_{pix_i \in L_{target}} \min_{pix_k \in L_{rendered}} d(pix_i, pix_k)^2$$

$$d(pix_i, pix_k)^2 = \lambda * (pix_k \cdot u_i)^2 + (pix_k \cdot n_i)^2$$

wherein $pix_i$ corresponds to a point of the user sketch, $L_{target}$ corresponding to the whole set of points $pix_i$ of the user sketch, wherein $pix_k$ corresponds to a point of the 2D visible wireframe, $L_{rendered}$ corresponding to the whole set of points $pix_k$ of the 2D visible wireframe, wherein for each point $pix_i$ of the user sketch, $u_i$ corresponds to a 2D local stroke direction which extends through two points of the user sketch, which pass by the point of the user sketch $pix_i$, $n_i$ is orthogonal to $u_i$ at the point $pix_i$, thereby forming a local 2D orthonormal system ($pix_i$; $u_i$, $n_i$), n being a number of points of the user sketch, and wherein λ is a scalar such that λ>1.

12. The method according to claim 1, wherein sub-step c2) further comprises:

performing a tessellation of the modified 3D model, thereby obtaining a 3D mesh;

performing a differentiable rasterization of the 3D mesh, which returns image fragments based on the 3D mesh and based on camera parameters; and performing a shading of the 3D mesh, including obtaining the visible outer edges of the 3D mesh, and the visible inner edges of the 3D mesh, said visible inner edges being obtained based on data stored in the image fragments.

13. The method according to claim 12, wherein the tessellation further comprises:

converting each face of the modified 3D model into a plurality of triangles, and the differentiable rasterization includes the following sub-steps:

ss1) each triangle is rendered using a unique color;

ss2) each pixel of each triangle is expressed in barycentric coordinates, in a basis formed by vertices of the corresponding triangle; and combining sub-steps ss1) and ss2).

14. The method according to claim 13, wherein, for each image fragment of the 3D mesh, the visible inner edges are computed by computing a normal of the image fragment, and by computing gradients between said normal.

15. The method according to claim 12, wherein, for each image fragment of the 3D mesh, the visible inner edges are computed by computing a normal of the image fragment, and by computing gradients between said normal.

16. The method according to claim 15, wherein a unique color is associated with the normal direction of each image fragment, the inner edges being computed by computing the gradient between said unique colors.

17. The method according to claim 1, wherein the second term, being a custom Chamfer energy, is computed as follows:

$$e_{chamfer} = \frac{1}{n} \sum_{pix_i \in L_{target}} \min_{pix_k \in L_{rendered}} d(pix_i, pix_k)^2$$

$$d(pix_i, pix_k)^2 = \lambda * (pix_k \cdot u_i)^2 + (pix_k \cdot n_i)^2$$

wherein $pix_i$ corresponds to a point of the user sketch, $L_{target}$ corresponding to the whole set of points $pix_i$ of the user sketch, wherein $pix_k$ corresponds to a point of the 2D visible wireframe, $L_{rendered}$ corresponding to the whole set of points $pix_k$ of the 2D visible wireframe, wherein for each point $pix_i$ of the user sketch, $u_i$ corresponds to a 2D local stroke direction which extends through two points of the user sketch, which pass by the point of the user sketch $pix_i$, $n_i$ is orthogonal to $u_i$ at the point $pix_i$, thereby forming a local 2D orthonormal system ($pix_i$; $u_i$, $n_i$), n being a number of points of the user sketch (3), and wherein $\lambda$ is a scalar such that $\lambda>1$.

18. The method according to claim 1, wherein the energy comprises a third term, being a projection regularization energy, which is computed as follows:

$$e_{projection} = 1 - \text{mean}\left(\frac{\text{Mask}_1 * \text{Mask}_2}{\text{Mask}_1 + \text{Mask}_2 - \text{Mask}_1 * \text{Mask}_2}\right)$$

wherein $Mask_1$ is a first mask of the projection, on a plane perpendicular to the sight of view direction, of the initial 3D model, wherein $Mask_2$ is a second mask of the projection, on a plane perpendicular to the sight of view direction, of the modified 3D model, operators "*" and "+" are a pixel-wise operators, and "mean" corresponds to the mean pixel value of an image.

19. A non-transitory computer-readable data-storage medium having computer-executable instructions to cause a computer system to carry out a computer-implemented method for designing a 3D model, comprising:

a) obtaining an initial 3D model in a 3D scene, the initial 3D model including at least one extruded section, said at least one extruded section being defined by a set of parameters;

b) receiving a user sketch on the plane perpendicular to the sight of view direction;

c) at each iteration of a plurality of iterations:

c1) modifying at least one of said parameters, thereby obtaining a modified 3D model;

c2) performing a perspective projection, on the plane perpendicular to the sight of view direction, of the modified 3D model, thereby obtaining a 2D visible wireframe, said 2D visible wireframe including visible inner and outer edges of the modified 3D model; and c3) computing an energy which including a first term which penalizes an inconsistency between the modified 3D model and the initial 3D model, and a second term which penalizes a mismatch between the 2D visible wireframe and the user sketch (3), said parameters being modified to minimize said energy; and d) outputting the modified 3D model.

20. A computer system comprising:

a processor coupled to a memory, the memory storing computer-executable instructions that when executed by the processor causes the processor to be configured to:

a) obtain an initial 3D model in a 3D scene, the initial 3D model including at least one extruded section, said at least one extruded section being defined by a set of parameters;

b) receive a user sketch on the plane perpendicular to the sight of view direction;

c) at each iteration of a plurality of iterations:

c1) modify at least one of said parameters, thereby obtaining a modified 3D model;

c2) perform a perspective projection, on the plane perpendicular to the sight of view direction, of the modified 3D model, thereby obtaining a 2D visible wireframe, said 2D visible wireframe including the visible inner and outer edges of the modified 3D model; and c3) compute an energy which including a first term which penalizes an inconsistency between the modified 3D model and the initial 3D model, and a second term which penalizes a mismatch between the 2D visible wireframe and the user sketch, said parameters being modified to minimize said energy; and d) outputting the modified 3D model.

* * * * *